United States Patent [19]

Schulz

[11] Patent Number: 5,618,490

[45] Date of Patent: Apr. 8, 1997

[54] VACUUM INSTALLATION, IN PARTICULAR FOR RECYCLING METALLURGY

[75] Inventor: Reiner Schulz, Aachen, Germany

[73] Assignee: Mannesmann Aktiengesellschaft, Düsseldorf, Germany

[21] Appl. No.: 454,390

[22] PCT Filed: Dec. 15, 1993

[86] PCT No.: PCT/EP93/03545

§ 371 Date: Aug. 7, 1995

§ 102(e) Date: Aug. 7, 1995

[87] PCT Pub. No.: WO94/14984

PCT Pub. Date: Jul. 7, 1994

[30] Foreign Application Priority Data

Dec. 18, 1992 [DE] Germany ............... 42 43 687.7

[51] Int. Cl.⁶ ...................................... C21C 7/10
[52] U.S. Cl. ............................ 266/208; 75/385
[58] Field of Search ................... 266/208, 209, 266/210; 75/385, 512; 417/205

[56] References Cited

U.S. PATENT DOCUMENTS

| 3,642,384 | 2/1972 | Huse | 417/205 |
| 3,700,429 | 10/1972 | Ramachandran | 75/385 |
| 4,251,269 | 2/1981 | Hoshi et al. | 75/385 |

*Primary Examiner*—Scott Kastler
*Attorney, Agent, or Firm*—Cohen, Pontani, Lieberman, Pavane

[57] ABSTRACT

A vacuum plant, in particular for secondary metallurgy, having at least one ejector which is in communication with a closed container within which a metallurgical vessel which is to be placed under pressure can be brought. A second ejector is connected in series with the one ejector via an intermediate condenser having a cooling water feed line and a condensate discharge line. A final condenser and a suction pump are connected to the second ejector. A controllable condensate distributor member is provided in the condensate discharge line of the intermediate condenser. One line of the distributing member is connected to a heat exchanger and the other line is connected to the cooling water supply of a final condenser.

10 Claims, 2 Drawing Sheets

5,618,490

VACUUM INSTALLATION, IN PARTICULAR FOR RECYCLING METALLURGY

BACKGROUND OF THE INVENTION

1. Field of the Invention

The present invention relates to a vacuum plant, in particular for secondary metallurgy, having at least one steam ejector which is in communication with a closed container within which a metallurgical vessel which is to be subjected to a vacuum can be brought. The vacuum plant further has a second steam ejector connected in series with the first steam ejector via an intermediate condenser having a cooling-water feed line and a condensate discharge line. A final condenser and a suction pump are connected in series to the second steam ejector.

2. Description of the Prior Art

Vacuum plants which are to subject large volumes in the shortest possible time to a pressure of about 0.5 mbar are presently used in the metallurgical industry. For the drawing-off of air, steam ejectors are employed, at least two of which—and frequently three—depending on the design of the plant, are connected in series without an intermediate condenser. These steam ejectors have centrally arranged nozzles which are operated with steam.

The working agent, steam, in this connection drives air or gas in a known manner. While pure air or gases are still being drawn-in in the first stage, a mixture of steam and air or gas which must be driven by the steam working agent in the second stage, leaves the first stage. In each further stage, the proportion of steam in the driving fluid increases, with the result that the use of the driving agent must be increased in each following stage. In this way, the overall efficiency of the vacuum installation decreases. To be sure, the efficiency of the individual ejector stages is about equal and the increasing amount of steam in each stage causes a substantial impairment of the efficiency of the plant.

In order to reduce the steam content of the driven fluid, condensers are employed. As cooling water, untreated industrial water is generally employed. With this cooling water, it is not possible to remove the desired, once-established amount of moisture from the working fluid at low pressures or to condense the steam, since this cooling water has at least ambient temperature and the pressure in the condenser can in no case be brought below the vapor pressure corresponding to the temperature of the cooling water.

SUMMARY OF THE INVENTION

The object of the present invention is to create a vacuum installation of the above-discussed type in which a process-optimized production of vacuum of large containers is possible, independent of climatic influences, with a minimum of structural parts.

Pursuant to this object, and others which will become apparent hereafter, one aspect of the present invention resides in a vacuum plant having a closed container configured to receive a metallurgical vessel to be placed under vacuum. At least one steam ejector is in communication with the closed container and a further steam ejector is connected in series with the at least one steam ejector. An intermediate condenser is connected between the at least one steam ejector and the further steam ejector, and has a feed line and a condenser discharge line. A final condenser and a suction pump are connected in series to the further steam ejector. A heat exchanger is connected in the condensate feed line of the intermediate condenser, and the condensate feed and discharge lines of the intermediate condenser form a closed circuit. The final condenser has a condensate feed line which is in communication with the condensate discharge line of the intermediate condenser.

In the vacuum plant of the invention, a condenser is used which is cooled by a cooling system to temperatures below ambient temperature. In the case of the use of a mixing condenser, the cooling water flowing into the condenser is previously cooled. Due to the lower temperatures in the condenser, one can operate at lower pressures than in traditional installations. In this way, there is already condensed out at an earlier time drive steam which in the known systems had to be compressed with air or gas with a considerable use of energy. It is found that, as compared with a traditional installation in which a total of four steam ejectors are required in order to produce a vacuum of up to 0.2 mbar, one of the steam ejectors can be dispensed with and one can thus get along with a total of only three steam ejectors. The checking of the overall balance sheet of these known vacuum installations and those of the invention shows that, despite the energy necessary for the cooling, the overall energy balance sheet of the system in accordance with the invention is more favorable.

In the vacuum installation proposed, not only is the cooling fluid of the intermediate condenser conducted, in order to reduce the energy required, within a closed circuit, but excess cooled condensate is also fed to the final condenser.

A salt solution can advantageously be used as fluid, since it permits the use of extremely low condenser temperatures.

Another advantage of the use of a condensate cooler is that vacuum installations can be operated independently of the temperature of the industrial water and can thus be used throughout the entire world, and therefore also in regions of more unfavorable climate where otherwise a larger number of steam ejectors, connected one behind the other, would have to be used in front of the first condenser, with the well-known negative consequences as to the consumption of steam.

A further advantage of the invention is that, due to the smaller containers to be evacuated, namely the elimination of a large steam ejector in front of the first condenser, the start-up times of a steel degasification plant are reduced. This has the effect, desired inter alia for given metallurgical processes, that the cooling of the slag is less.

It is furthermore possible to design the plant to obtain the minimum seasonal average energy consumption. As soon, namely, as the ambient temperature in winter comes into the region of the cooling-water inlet temperature, used for the cooling of the first condenser, the cooling unit can remain disconnected. On the other hand, in traditional plants, it is not possible to save energy in winter by, for instance, disconnecting the last steam ejector in front of the first condenser, since the steam ejectors following the intermediate condenser could then not overcome the higher pressure ratio.

In addition to this, another advantage of the invention is that, since the amount of cooling water of the first condenser is recycled, only the condensate need be brought to ambient pressure, as a result of which the drive power of water-removal pumps possibly present becomes less. In smaller installations, it is proposed, as further structural simplification, that a directly cooled surface condenser be used for the condensation.

One example of the invention is shown in the accompanying drawing.

DETAILED DESCRIPTION OF THE PREFERRED EMBODIMENTS

Figure 1:
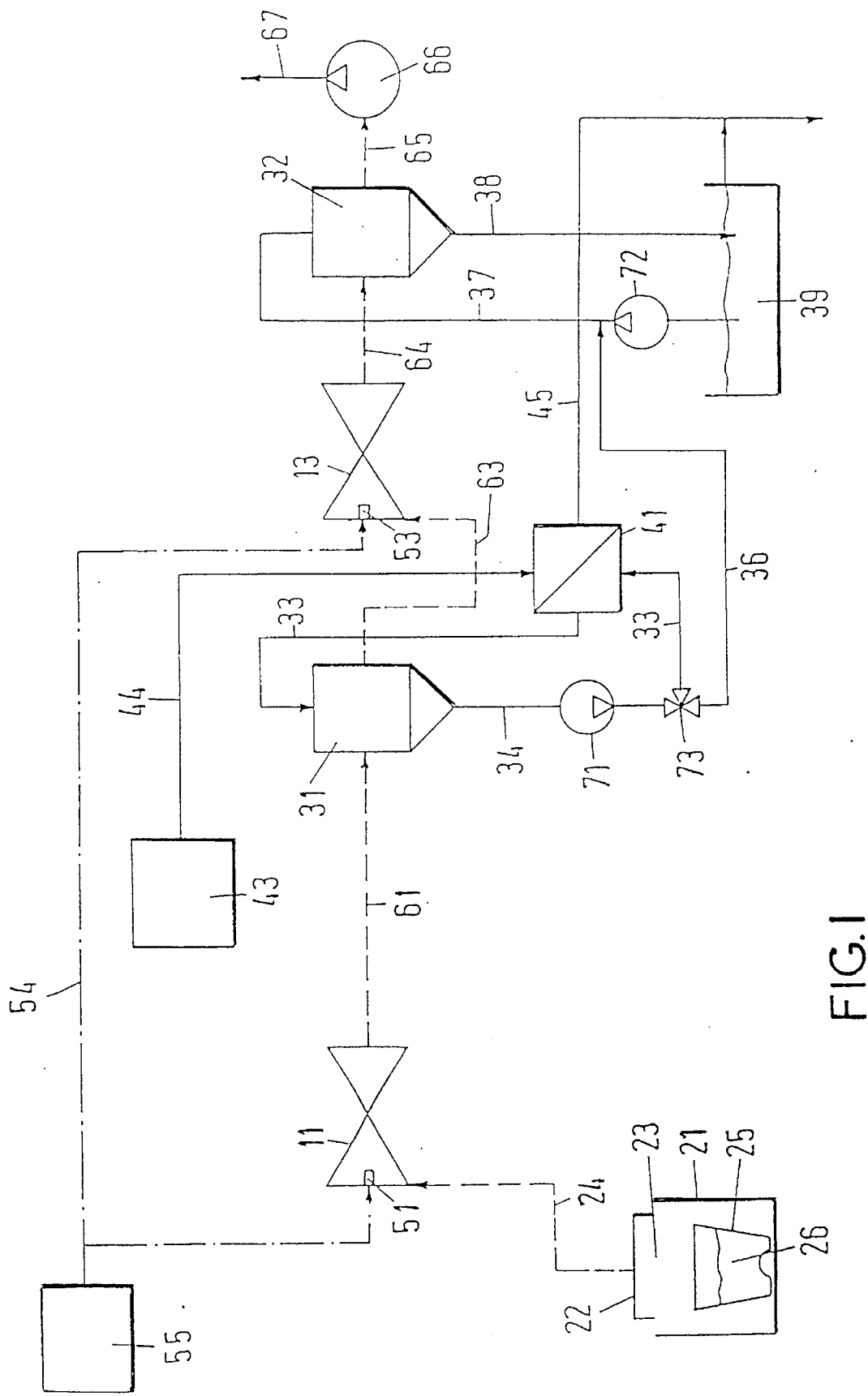
FIG. 1 is a diagram of a vacuum installation pursuant to the present invention in which the condensate feed line has a controllable condensate distributing member.
Figure 2:
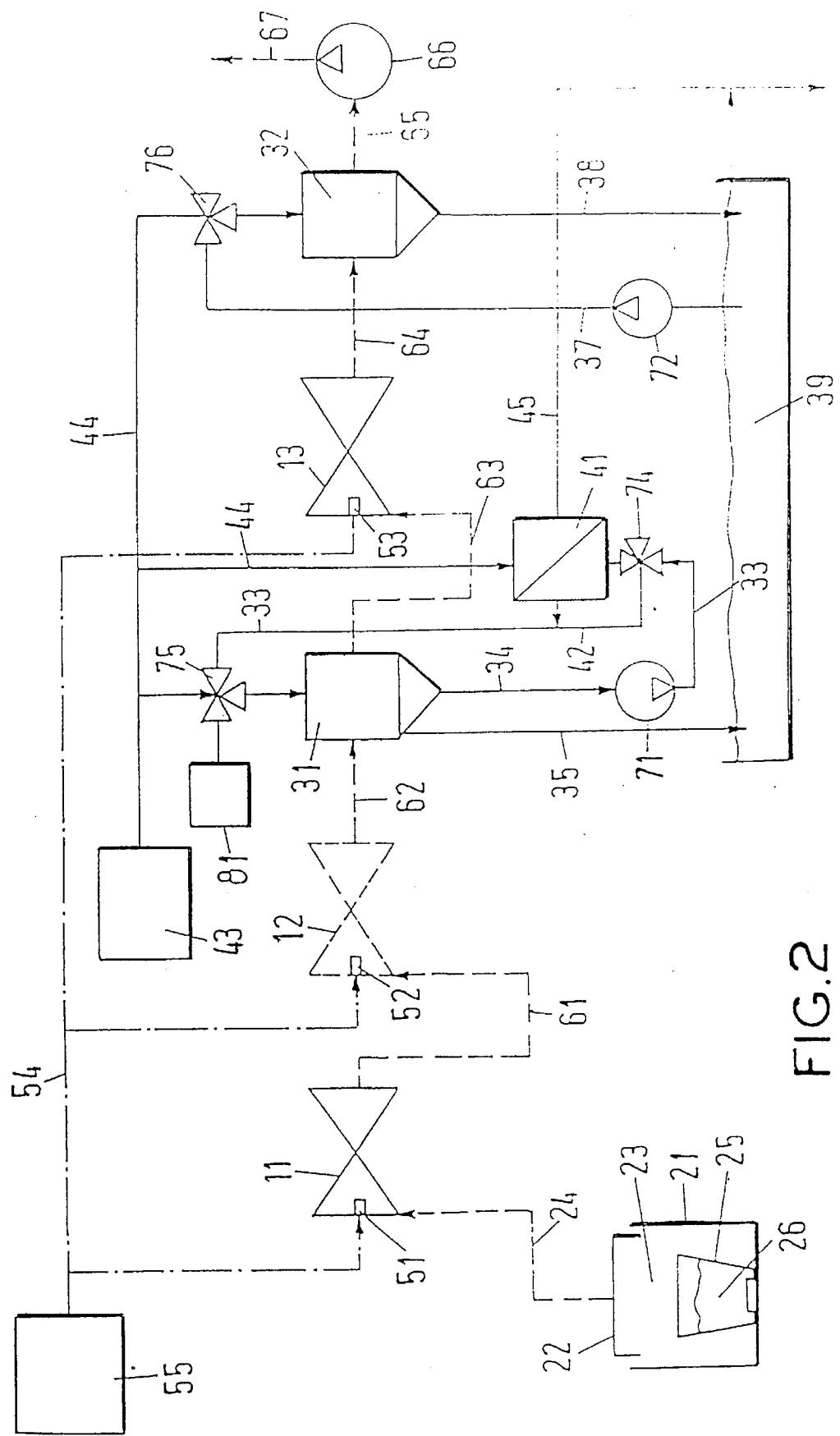
FIG. 2 is a diagram of a vacuum installation in which an overflow pipe is provided at the intermediate condenser.

In FIGS. 1 and 2, a steam ejector 11 is connected to a vacuum container 21 which is closed by a cover 22. In the interior 23 of the container 21 there is a metallurgical vessel 25 which can be filled with molten metal 26.

On the steam ejector 11 there is provided a steam nozzle 51 to which a steam feed line 54 extends. In addition, the steam ejector 11 is connected by a suction line 61 with an intermediate condenser 31. The vacuum container 21 is connected to the steam ejector 11 by a line 24. The intermediate condenser is preferably a directly cooled surface condenser.

In the lower region of the intermediate condenser 31 there is a condensate discharge line 34 within which a pump 71 is installed which pumps the condensate into a condensate feed line 33.

Within this condensate feed line 33, there is a heat exchanger 41 which is connected with a cooling-water line 44, and with a coolant discharge line 45. The cooling-water line 44 is in communication with a coolant feed device 43.

In the condensate feed line 33 there is a three-way member 73 which is in communication, via a connecting line 36, with a condensate feed line 37 of a final condenser 32. This final condenser 32 has a condensate discharge line 38 which discharges into a collecting basin 39. A pump 72 is fed from the collecting basin 39 and pumps the cooling agent into the condensate feed line 37.

From intermediate the condenser 31, the conveyor fluid is conveyed via a discharge line 63 to a steam ejector 13. The ejector 13 has a steam nozzle 53 which is connected with the steam feed line 54 which in turn is connected to a steam production station 55. From the steam ejector 13, a suction line 64 extends to the condenser 32. The condenser 32 has a suction line 65 which is connected to a suction pump 66 which conveys into the atmosphere via an exhaust line 67 or air.

In FIG. 2, an overflow pipe 35 which discharges into the collecting basin 39 is furthermore provided on the intermediate condenser 31. Furthermore, different than in FIG. 1, the coolant feed line 33 contains a three-way valve 74 which conducts the condensate through the heat-exchanger 41 or via a by-pass line 42 to the intermediate condenser 31. Furthermore, in front of the condensers 31 and 32 there are displacement members (3 way valves) 75,76, respectively which permit a feeding of cooling water from the cooling water line 44.

Additionally, the condenser 31 is connected to a salt-feed device 81.

FIG. 2 furthermore shows the construction of a vacuum installation in which a further steam ejector 12 resulting from the design can be used. The further ejector 12 is connected to the suction line 61 of the steam ejector 11, and has a suction line 62 connected to the intermediate condenser 31. The steam feed line 54 is connected to the ejector 12 at a steam nozzle 52.

I claim:

1. A vacuum plant, comprising:

a closed container configured to receive a metallurgical vessel which is to be placed under vacuum;

at least one steam ejector in communication with the closed container;

a further steam ejector connected in series with the at least one steam ejector;

an intermediate condenser connected between the at least one steam ejector and the further steam ejector, and having a condensate feed line and a condensate discharge line;

a final condenser;

a suction pump, the final condenser and the suction pump being connected in series to the further steam ejector; and a heat exchanger provided in the condensate feed line of the intermediate condenser, the condensate feed line and the condensate discharge line of the intermediate condenser being configured to form a closed circuit, the final condenser having a condensate feed line in communication with the condensate discharge line of the intermediate condenser.

2. A vacuum plant according to claim 1, and further comprising controllable condensate distribution means arranged in the condensate discharge line of the intermediate condenser, the distribution means including one line connected to the heat exchanger and another line connected to the condensate feed line of the final condenser.

3. A vacuum plant according to claim 2, wherein the controllable condensate distribution means includes a 3-way valve connected in the condensate discharge line of the intermediate condenser.

4. A vacuum plant according to claim 1, and further comprising a collecting basin arranged to collect discharged condensate from the final condenser, the intermediate condenser having an overflow pipe which is connected to the collecting basin.

5. A vacuum plant according to claim 1, and further comprising a by-pass line connected to the condensate feed line of the intermediate condenser in front of and behind the heat exchanger.

6. A vacuum plant according to claim 1, and further comprising cooling water supply means connected to the heat exchanger and the feed lines of the condensers for supplying coolant thereto.

7. A vacuum plant according to claim 1, and further comprising a salt-feed device connected to the condensate feed line of the intermediate condenser.

8. A vacuum plant according to claim 1, wherein the intermediate condenser is a directly cooled surface condenser.

9. A vacuum plant according to claim 4, and further comprising pump means arranged in the condensate feed line of the final condenser for pumping coolant from the collecting basin to the final condenser.

10. A vacuum plant according to claim 6, and further comprising 3-way valve means arranged in the condensate feed line of the intermediate condenser for selectively feeding cooling water from the cooling water supply means to the intermediate condenser.

* * * * *